United States Patent
Khojastepour et al.

(10) Patent No.: US 8,767,665 B2
(45) Date of Patent: Jul. 1, 2014

(54) FEED-FORWARD CONTROL SIGNALING AND DECODING SCHEMES

(71) Applicant: NEC Laboratories America, Inc., Princeton, NJ (US)

(72) Inventors: Mohammad A. Khojastepour, North Brunswick, NJ (US); Narayan Prasad, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/967,582

(22) Filed: Aug. 15, 2013

(65) Prior Publication Data

US 2013/0329677 A1    Dec. 12, 2013

Related U.S. Application Data

(62) Division of application No. 13/115,162, filed on May 25, 2011, now Pat. No. 8,625,695.

(60) Provisional application No. 61/373,543, filed on Aug. 13, 2010.

(51) Int. Cl.
*H04B 7/02* (2006.01)
*H04B 7/04* (2006.01)
*H04L 5/00* (2006.01)
*H04B 7/06* (2006.01)

(52) U.S. Cl.
CPC ............ *H04B 7/0452* (2013.01); *H04L 5/0094* (2013.01); *H04B 7/0665* (2013.01); *H04L 5/0023* (2013.01); *H04B 7/0639* (2013.01); *H04B 7/0632* (2013.01)
USPC ........... 370/329; 370/328; 370/252; 370/310; 370/464; 375/267; 375/347; 375/340; 375/260

(58) Field of Classification Search
CPC ..... H04B 7/0452; H04B 7/02; H04W 72/042; H04W 72/0413; H04W 28/04; H04W 72/04; H04L 5/0023; H04L 1/02
USPC .......... 370/329, 328, 252, 310, 464; 375/267, 375/347, 340, 260
See application file for complete search history.

(56) References Cited

U.S. PATENT DOCUMENTS

| | | |
|---|---|---|
| 2006/0251193 A1 | 11/2006 | Kopmeiners et al. |
| 2006/0252386 A1 | 11/2006 | Boer et al. |
| 2007/0117570 A1 | 5/2007 | Noh et al. |
| 2009/0100186 A1 | 4/2009 | Darshan et al. |
| 2009/0213955 A1 | 8/2009 | Higuchi et al. |
| 2009/0322613 A1 | 12/2009 | Bala et al. |

FOREIGN PATENT DOCUMENTS

| | | |
|---|---|---|
| JP | 2007-28569 A | 2/2007 |
| JP | 2007-525096 A | 8/2007 |

OTHER PUBLICATIONS

NTT DOCOMO, Control Signaling to Support for Enhanced DLMIMO, RI-104021, 3GPP RAN WGJ meeting#61bis (Jun. 28, 2010).

*Primary Examiner* — Jamal Javaid
(74) *Attorney, Agent, or Firm* — Akitaka Kimura

(57) ABSTRACT

A method implemented in a base station used in a wireless communications system is disclosed. The method comprises transmitting an index indicating data stream parameters, and transmitting an indication of the number of transmit antennas at the base station, wherein the data stream parameters for 8 transmit antennas are indicated by the index according to a first table, and wherein the data stream parameters for 4 transmit antennas are indicated by the index according to a second table. Other methods, apparatuses, and systems also are disclosed.

12 Claims, 3 Drawing Sheets

FEED-FORWARD CONTROL SIGNALING AND DECODING SCHEMES

RELATED APPLICATION INFORMATION

This application is a division of co-pending patent application Ser. No. 13/115,162 filed on May 25, 2011, which in turn claims priority to provisional application Ser. No. 61/373, 543 filed on Aug. 13, 2010, incorporated herein by reference.

This application is also related to co-pending, commonly owned utility patent application Ser. No. 12/642,126 filed on Dec. 18, 2009, incorporated herein by reference.

BACKGROUND

1. Technical Field

The present invention relates to wireless transmission systems and, more particularly, to the conveyance of control information in such systems.

2. Description of the Related Art

In broadband wireless systems, such as Orthogonal Frequency Division Multiple Access (OFDMA) based systems, control information regarding transmitted data streams in the downlink to a mobile user is signaled implicitly via a control channel by a base station in the system. The parameters specified in this information can considerably affect the rate of the transmission and the decoding accuracy. For example, for the Long Term Evolution (LTE)-Advanced standard, one proposal signals the total number of streams, the allocation of stream identifiers to a particular user, and the modulation type utilized by other co-scheduled multiple input-multiple output (MIMO) users in a Multiuser (MU)-MIMO transmission. Here, the control signals are designed by considering all the feed-forward control parameters jointly. For example, for a feed-forward sequence having a length of five bits, the $2^5=32$ different possible indices are divided into different sets that are allocated to support 2 stream, 4 stream and 8 stream transmission, respectively.

SUMMARY

Exemplary embodiments of the present principles can improve the scope of control information that can be transmitted to receivers by employing the number of transmit antenna in combination with feed-forward control signal parameters.

One embodiment is directed to a method for decoding parameter allocation information. In accordance with the method, an index indicating selected data stream parameters is received. In addition, an indication of a number of transmit antennas at a transmitter from which the data stream is transmitted is also received. Further, the selected parameters are determined from the index based on the number of transmit antennas at the transmitter. Moreover, data signals are received and processed with a processor in accordance with the selected data stream parameters.

Another embodiment is directed to a receiver system for decoding parameter allocation information. The system includes a receiver that is configured to receive an index indicating selected data stream parameters for at least one data stream and to receive an indication of a number of transmit antennas at a transmitter from which the at least one data stream is transmitted. The system further includes a processor that is configured to determine the selected parameters from the index based on the number of transmit antennas at the transmitter and to process data signals in accordance with the selected data stream parameters.

An alternative embodiment is directed to a wireless transmission system. The system includes a plurality of base stations, wherein each base station provides a different number of transmit antennas for the transmission of at least one data stream to a corresponding receiver. In addition, the system includes at least one controller that is configured to select data stream parameters for the corresponding receiver and to determine an index for the selected data stream parameters for transmission to the corresponding receiver by utilizing an indexing scheme. Here, each base station utilizes a different indexing scheme and each indexing scheme is customized to a corresponding number of transmit antennas of a corresponding base station.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with one aspect of the present principles, the precision and scope of data stream parameter information conveyed to receivers can be improved by employing the number of transmit (TX) antennas at the base station. In particular, the receivers can interpret the bits of the control signals differently for different numbers of TX antennas at a base station. Here, the number of TX antennas can be independently signaled to the receiver. The system configuration and, in particular the number of transmit antennas at the base station, should be detectable by the receivers in such systems in order to establish the connection. Signaling to indicate the number of TX antennas at the base-station is generally supported by known systems. Accordingly, the improvements to data stream parameter precision and scope in the control signals in accordance with the present principles can be achieved without increasing the amount of information transmitted between the base station and a receiver.

Figure 1:
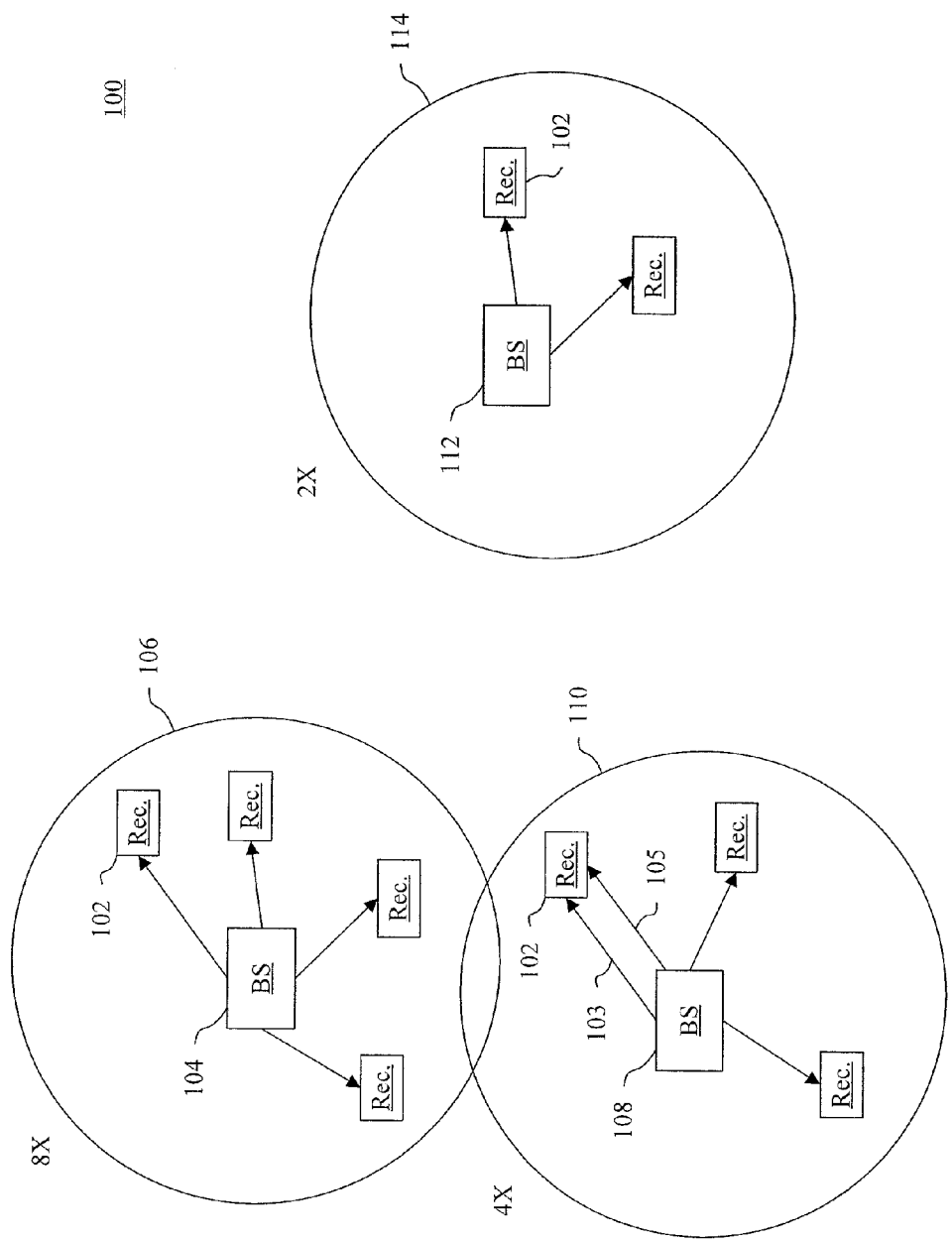
FIG. 1 is a high-level block diagram of an exemplary wireless transmission system.

Referring now in detail to the figures in which like numerals represent the same or similar elements and initially to FIG. 1, an OFDMA based MU-MIMO system 100 in which embodiments of the present invention may be implemented is illustrated. In the downlink of system 100, multiple scheduled users or receivers (Rec.) 102 in cells 106, 110 and 114 are simultaneously served by base stations 104, 108 and 112, respectively, on available sets of resource blocks (RBs). Each RB can be a particular set of subcarriers and consecutive OFDM symbols. For expository purposes, the base station 104 can represent a base station with eight transmit antennas, the base station 108 can represent a base station with four transmit antennas and the base station 112 can represent a base station with two transmit antennas. It should be understood that base stations in the system 100 can employ other numbers of transmit antennas. Furthermore, one or more of the base stations in the system 100 can have the same number of transmit antennas in certain embodiments. In addition, the receivers 102 can be configured in the same manner and can be co-scheduled. Co-scheduled receivers can comprise, for example, receivers that are assigned at least one resource block (RB) that overlaps with at least one RB assigned to one or more other receivers.

In an OFDMA MU-MIMO system, which can be implemented in the system 100, each active user or receiver can report a preferred precoder matrix index (PMI), which identifies a specific vector (or matrix) in a code-book of unit norm vectors (or matrices) used to encode signals between the base station and users. Further, each receiver can report a channel quality index (CQI) to the base station, which, in turn, can use the PMI and CQI to determine an appropriate set of scheduled users and data stream parameters for each user. The base station provides each scheduled receiver with its data stream parameters, which can indicate assigned resource blocks that are used to transmit data to the respective scheduled user.

In such a system, performance can be improved if a scheduled receiver is informed of some data stream parameters of other overlapping co-scheduled users, such as their corresponding precoding matrices, power levels, data stream identifier allocations and modulations. For example, as discussed further below, such information permits the user to estimate effective channels, reduce demodulation errors and suppress interference due to transmissions intended for overlapping co-scheduled users. Exemplary embodiments of the present invention discussed herein below can employ signaling design features which enable a base-station to efficiently convey the data stream parameters of other overlapping co-scheduled receivers to one or more scheduled receivers, in addition to that receiver's own data stream parameters.

It should be noted that any base station of the system 100 can communicate with a scheduled receiver 102 by employing a data channel 103 and a control channel 105. For example, data of all scheduled users may be transmitted over the data channel 103. A user can decode its data using the data stream parameters made accessible to it. In turn, data stream parameters of all scheduled users may be transmitted over the control channel 105. Each user can access its data stream parameters along with at least some data stream parameters of some or all of the overlapping co-scheduled users.

Figure 2:
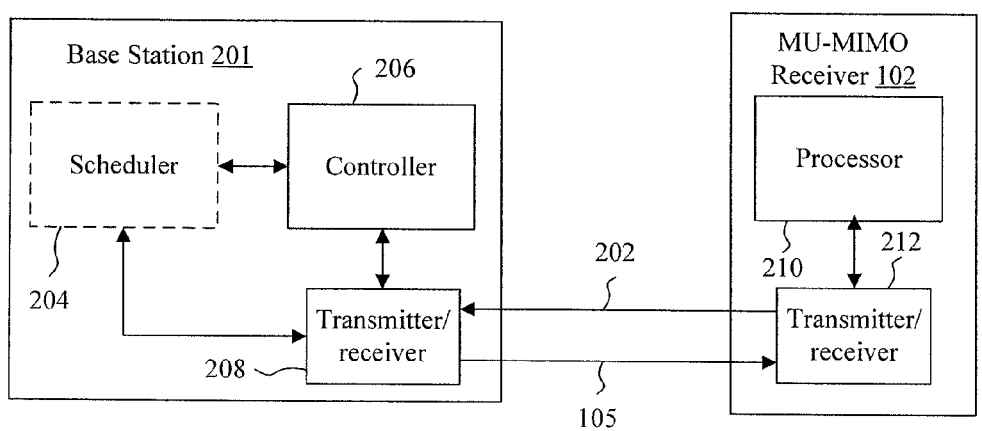
FIG. 2 is a high-level block/flow diagram of a base station and a receiver in accordance with an exemplary embodiment of the present invention.

With reference now to FIG. 2, with continuing reference to FIG. 1, a more detailed block/flow diagram of a base station system 201 and a MU-MIMO receiver system 102 is illustrated. The base station system 201 can be representative of any of the base stations of the system 100. However, the functions of the controller 206 can vary based on the number of TX antennas employed at the base station, as described in more detail herein below. The controller 206 can also utilize a storage medium (not shown) in the base station 201 to store and retrieve indexing tables, such as Table 2 described in more detail herein below. In addition, the receiver 102 can employ a transmitter/receiver 212 to transmit precoder matrix index information and channel quality index information to the base station 201 along an uplink control channel 202. In turn, the base station 201 may use a transmitter/receiver 308 to transmit data stream parameter information to each MU-MIMO receiver it is servicing along a downlink control channel 105. The base station 201 may further include an optional scheduler 204 and a controller 206, while the user 102 can include a processor 210. The elements of base station 201 and MU-MIMO receiver 102 are discussed in more detail below with respect to method embodiments. It should also be noted the functions and configuration of the MU-MIMO receiver 102 is representative and can be implemented by any one or more other MU-MIMO receivers serviced by the base station 201.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To better illustrate the advantages provided by the present principles, an example of a proposed indexing scheme that can be used to convey data stream parameters to receivers is provided herein below in Table 1. Here, Si denotes the index used to identify the combination of the number of streams allocated to a particular resource, the pilot stream index (PSI) allocated to a receiver in a MU-MIMO transmission, and the modulation constellation of a paired user. The pilot stream index can indicate resource blocks in which pilot signals can be found for the receiver.

TABLE 1

Exemplary Indexing Scheme

| | | |
|---|---|---|
| Si | 5 | Index used to identify the combination of the number of streams and the allocated pilot stream index in a transmission with MU-MIMO, and the modulation constellation of paired user in the case of 2 stream transmission<br>0b00000: 2 streams with PSI = stream0 and other modulation = QPSK<br>0b00001: 2 streams with PSI = stream0 and other modulation = 16QAM |

TABLE 1-continued

Exemplary Indexing Scheme

0b00010: 2 streams with PSI = stream0 and other modulation = 64QAM
0b00011: 2 streams with PSI = stream0 and other modulation information not available
0b00100: 2 streams with PSI = stream1 and other modulation = QPSK
0b00101:_2 streams with PSI = stream1 and other modulation = 16QAM
0b00110:_2 streams with PSI = stream1 and other modulation = 64QAM
0b00111:_2 streams with PSI = stream1 and other modulation information not available
0b01000:_3 streams with PSI = stream0
0b01001:_3 streams with PSI = stream1
0b01010:_3 streams with PSI = stream2
0b01011:_4 streams with PSI = stream0
0b01100:_4 streams with PSI = stream1
0b01101:_4 streams with PSI = stream2
0b01110:_4 streams with PSI = stream3
0b01111:_3 streams with PSI = stream0 and stream1
0b10000:_4 streams with PSI = stream0 and stream1
0b10001:_4 streams with PSI = stream2 and stream3
0b10010: 8 streams with PSI = stream0
0b10011: 8 streams with PSI = stream1
0b10100: 8 streams with PSI = stream2
0b10101: 8 streams with PSI = stream3
0b10110: 8 streams with PSI = stream4
0b10111: 8 streams with PSI = stream5
0b11000: 8 streams with PSI = stream6
0b11001: 8 streams with PSI = stream7
0b11010: 8 streams with PSI = stream0 and stream1
0b11011: 8 streams with PSI = stream2 and stream3
0b11100: 8 streams with PSI = stream4 and stream5
0b11101: 8 streams with PSI = stream6 and stream7
0b11110: reserved
0b11111: reserved As described above, with feed-forward data having a length of five bits, the 2^5=32 different indices are divided into different sets that are allocated to support 2 stream, 4 stream and 8 stream transmission, respectively.

In contrast to the indexing scheme of Table 1, embodiments of the present principles can leverage existing system configurations and, in particular, the conveyance of the number of transmit antennas to receivers. For example, the number of transmit antennas can be signaled explicitly to receivers. Thus, the base stations and the receivers can interpret control signals bits based on the number of transmit (TX) antennas. For example, the combination of a number of available streams, the stream identifiers allocated to the receiver and the modulation type of the other co-scheduled users in the downlink MU-MIMO system can be interpreted differently based on the number of transmit antennas.

To implement these features, in exemplary embodiments, the following aspects can be considered jointly. First, the number of transmit antennas at the base station is known to the receiver. Second, the number of streams allocated to the user with M receive antennas is not more than M. Third, the number of streams transmitted in the downlink is less than or equal to the number of transmit antennas at the base station.

One important advantage recognized here is that the number of data streams transmitted on a particular resource block can be limited by the number of TX antennas at a base station. Thus, continuing with the five-bit feed-forward example, as opposed to dividing the 32 possible indices and dedicating subsets of the indices to 2 TX, 4 TX or 8 TX data stream transmissions, respectively, as in Table 1, the present principles can expand the number of indices allocated to certain types of data stream transmissions by disregarding transmission cases that are essentially infeasible.

For example, it can be assumed that there are three possible configurations of a MU-MIMO system with either of 2 TX, 4 TX and 8 TX antennas in the downlink, as described above with regard to the base stations 112, 108 and 104, respectfully, of system 100. A bit sequence of a control signal can be taken from a table of all possible combinations of bit sequences. A subset of these combinations can be allocated to a specific number of available streams.

Any subset that corresponds to, for example, K streams can be applied only to a system with at least K antennas. For example, a subset of the bit combinations that carry signaling information for 8 streams is only applicable to the system with 8 TX antennas at the base-station. If such a configuration is not available, such as, for example, in a base station with 4 TX antennas, this subset of bit combinations is "wasted" in that no information can be signaled by the base station. In accordance with aspects of the present principles, as noted above, bit combinations of control signals can be interpreted differently for different TX antennas. In particular, for each type of base station, embodiments can potentially utilize all combinations usefully to carry signaling information.

Continuing with the five-bit length signaling example, 32 different bit combinations can be used for signaling. The interpretation of these 32 bits can vary based on a priori knowledge at the receiver 102 of the number of TX antennas to potentially enable the use of all 32 bit combinations to signal information to the users for systems with 8 TX, 4 TX and 2 TX antennas at the base station. Thus, base stations can signal more cases of modulation types for the other co-scheduled users.

Table 2, below, provides exemplary implementations of indexing schemes with five signaling bits, where the modulation information is provided for two co-scheduled users. In the other cases, the table does not provide modulation information and only provides the index of the streams allocated to the user. However, it should be understood that the following table is only exemplary and other indexing schemes based on the number of transmit antenna at a transmitter can be utilized.

Si denotes the index used to identify the combination of the number of streams, the allocated pilot stream index and the modulation constellation of a co-scheduled receiver in a MU-MIMO transmission system. Nt denotes the number of transmit antennas at the base station and PSI denotes the pilot stream index (or indices) allocated to the user. The PSI can indicate one or more reference symbols in a resource block from which pilot streams can be retrieved.

TABLE 2

Indexing Schemes based on number of TX Antenna

| if (Nt == 8){ | | Parameters for multi-layer encoding for ABS with 8TX antenna |
|---|---|---|
| Si | 5 | Index used to identify the combination of the number of streams and the allocated pilot stream index in a transmission with MU-MIMO, and the modulation constellation of paired user in the case of 2 stream transmission |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101:_2 streams with PSI = stream1 and other |

TABLE 2-continued

Indexing Schemes based on number of TX Antenna

| | | |
|---|---|---|
| | | modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 8 streams with PSI = stream0 |
| | | 0b10011: 8 streams with PSI = stream1 |
| | | 0b10100: 8 streams with PSI = stream2 |
| | | 0b10101: 8 streams with PSI = stream3 |
| | | 0b10110: 8 streams with PSI = stream4 |
| | | 0b10111: 8 streams with PSI = stream5 |
| | | 0b11000: 8 streams with PSI = stream6 |
| | | 0b11001: 8 streams with PSI = stream7 |
| | | 0b11010: 8 streams with PSI = stream0 and stream1 |
| | | 0b11011: 8 streams with PSI = stream2 and stream3 |
| | | 0b11100: 8 streams with PSI = stream4 and stream5 |
| | | 0b11101: 8 streams with PSI = stream6 and stream7 |
| | | 0b11110: reserved |
| | | 0b11111: reserved |
| } else if (Nt = 4 or Nt = 2) { Si | Parameters for multi-layer encoding for ABS with 4 TX, 2 TX antennas | |
| | 5 | Index used to identify the combination of the number of streams and the allocated pilot stream index in a transmission with MU-MIMO, and the modulation constellation of paired user |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 3 streams with PSI = stream2 and other modulation = QPSK |
| | | 0b10011: 3 streams with PSI = stream2 and other modulation = 16QAM |
| | | 0b10100: 3 streams with PSI = stream2 and other modulation = 64QAM |
| | | 0b10101: 3 streams with PSI = stream0 and stream1 and other modulation = QPSK |
| | | 0b10110: 3 streams with PSI = stream0 and stream1 and other modulation = 16QAM |
| | | 0b10111: 3 streams with PSI = stream0 and stream1 and other modulation = 64QAM |
| | | 0b11000: 4 streams with PSI = stream0 and stream1 and other modulation = QPSK |
| | | 0b11001: 4 streams with PSI = stream0 and stream1 and other modulation = 16QAM |
| | | 0b11010: 4 streams with PSI = stream0 and stream1 and other modulation = 64QAM |
| | | 0b11011: 4 streams with PSI = stream2 and stream3 and other modulation = QPSK |
| | | 0b11100: 4 streams with PSI = stream2 and stream3 and other modulation = 16QAM |
| | | 0b11101: 4 streams with PSI = stream2 and stream3 and other modulation = 64QAM |
| | | 0b11110: reserved |
| | | 0b11111: reserved |
| } | | |

The underlined portions of Table 2 indicate the differences of the exemplary indexing schemes described therein with the indexing scheme of Table 1. As illustrated in Table 2, for an advanced base station (ABS) with four or less TX antenna, the indices directed to an 8 TX antenna base station in the scheme of Table 1 have been allocated to additional cases describing other possible combinations of stream allocations, pilot stream indices and modulation schemes of co-scheduled users. For example, the sequence 0b10010 transmitted from an 8 TX antenna base station indicates that eight data streams are transmitted and a PSI of zero is allocated to the receiver to which the sequence or index is directed. In turn, the sequence 0b10010 transmitted from a 4 TX antenna or 2 TX antenna base station indicates to a receiver that three data streams are transmitted, that the base station has allocated the receiver with a PSI of 2 and that the modulation scheme employed by a co-scheduled user is Quadrature phase-shift keying (QPSK). Here, the indication of three data streams, a PSI of 2 and the QPSK modulation of a co-scheduled user is a new combination that is not included in the indexing scheme of Table 1. The underlined bit sequences of Table 2 provide other similar examples. Accordingly, the use of the number of TX antenna with an indexing scheme can significantly improve the precision and scope of data stream parameter information conveyed to receivers. Furthermore, because the number of TX antenna is already known by the receiver, the improvement can be implemented without increasing the amount of control data transmitted to the receiver.

It should be noted with regard to the pilot stream that, as stated above, the pilot stream index can indicate the one or more reference symbols in a resource block from which a corresponding pilot stream can be retrieved. The receivers can be preconfigured to associate a PSI with a pattern of reference symbol positions in one or more resource blocks that indicates where the pilot streams can be located. Here, the pilot streams corresponding to a PSI can indicate an assigned precoder for the receiver to which the PSI is allocated. For example, the base station can encode the pilot signal in a pilot stream with the assigned precoder to indicate the precoder to the user. Alternatively or additionally, the pilot signal in the pilot stream can be scaled proportionally to indicate the power level used for data transmission, where the proportionality factor can be known to the receiver. The base station may also configure the pilot streams to explicitly signal a precoder matrix index and/or a power level associated with a data stream that the base station transmits to a user. Further, in addition to the precoder matrix index and the power level, one or more of the pilot streams associated with the PSI can signal or indicate specific resource blocks assigned to a receiver for the transmission of a data stream, can signal or indicate a modulation constellation per codeword and/or can signal or indicate a coding rate per codeword.

It should be understood that although the indexing schemes described above cross-reference indices with the number of streams transmitted and a pilot stream index as data stream parameters, the indexing schemes or tables can explicitly associate one or more indices with other assigned data stream parameters. For example, an indexing scheme or table can directly specify resource blocks on which data streams directed to the receiver are transmitted, a modulation constellation per codeword, a coding rate per codeword, at least one PMI and/or at least one transmit power value. Moreover, although Table 2 describes QPSK, 16 Quadrature Amplitude Modulation (QAM) and 64 QAM, the indices can be configured to indicate other types of modulation schemes.

Figure 3:
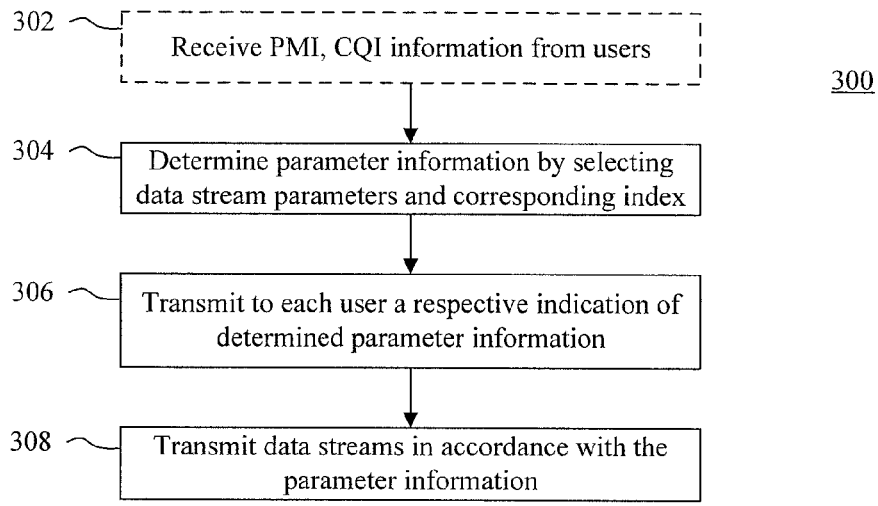
FIG. 3 is a high-level block/flow diagram of an exemplary method for transmitting data stream parameter information.

Referring now to FIG. 3, with continuing reference to FIGS. 1 and 2, an exemplary method 300 for transmitting data stream parameter information is illustrated. It should be noted that the method 300 can be implemented at each of the base stations 104, 108 and 112 of the system 100. As indicated above, each base station can provide a different number of transmit antennas for the transmission of at least one data stream to a corresponding receiver 102. While each base station 104, 108 and 112 can be configured to perform the method 300, the implementation of the method 300 can vary with regard to the indexing scheme applied due to the different number of transmit antenna employed at the base station, as described in more detail herein below.

The method 300 can begin at optional step 302, in which the transmitter/receiver 208 can receive PMI and CQI information from one or more receivers 102 within the operable range of the base station. For example, the base station 201 may use linear transmit precoding to serve each scheduled user. The PMI determines a particular precoding matrix from a codebook, or a set of precoding matrices, which is known to all receivers as well as to the base station (BS). The transmit precoder used by the BS and the modulation and coding scheme (MCS) it assigns to each scheduled receiver may depend on the PMI and CQI feedback it receives from the users over the uplink control or data channel. Thus, the PMI and CQI information can enable the controller 206 to determine appropriate data stream parameters for each receiver. A user can explicitly signal its preference to be a MU-MIMO user in its uplink feedback. Alternatively, a user can report its feedback information in any format and the BS can decide to schedule it as a MU-MIMO user.

At step 304, the controller 206 can generate parameter information by selecting data stream parameters and a corresponding index. As stated above, the data stream parameters can include a total number of data streams transmitted, a PSI, RB assignment, assigned modulation constellation per code word, coding rate per codeword, the PMI(s) used and/or the transmit power levels used. The PSI can itself indicate RB positions in which other data parameter information, such as PMI, transmit power levels, RB assignment, etc., can be conveyed. Here, the controller 206 can employ an optional scheduler 204 to perform RB assignment to each of the receivers 102 that the corresponding base station 201 services. Further, the controller 206 can be configured to employ one or more indexing schemes, such those described in Table 2, to select an index corresponding to the data stream parameters chosen for a particular receiver. As noted above, each base station can employ a different indexing scheme based on the number of TX antenna the base station employs. In particular, each indexing scheme can be customized to a corresponding number of transmit antennas of a corresponding base station. Thus, the controller 206 can be configured to determine the number of transmit antenna employed by the base station 201 and to apply the corresponding indexing scheme for that number of transmit antenna. For example, the controller 206 of the base station 104 can apply the upper portion of Table 2, which is directed to 8 TX antennas, and the controllers 206 at base stations 108 and 112 can apply the lower portion of Table 2, which is directed to 4 TX antennas or less. It should be noted that although the lower portion of Table 2 is directed to both 4 TX antenna and 2 TX antenna base stations, the indexing schemes can be configured so that each of the base stations 104, 108 and 112 employ a different indexing scheme. For example, the indices that are directed to the transmission of more than two data streams can be reallocated to provide additional data parameter information for the 2 TX antenna base stations that is not already present in Table 2. Moreover, each base station can be configured to store and employ Table 2 in its entirety or only the portion of the Table that relevant to that base station. For example, the controller 206 of the base station 104 can store and apply only the upper portion of Table 2 while the controllers 206 of base stations 108 and 112 can store and apply only the lower portion of Table 2. Thus, each portion of the Table 2 is equivalent to an independent table.

It should also be noted that, as illustrated in the exemplary indexing schemes of Table 2, the upper portion of Table 2 describes a different set of data stream parameters than the lower portion of Table 2. For example, both the upper and lower portions include descriptions of data stream parameters that are not included in the other portion. Further, in each of the upper and lower portions, at least a subset of the set data stream parameters indicate corresponding selections of a subset of a plurality of potential data transmission streams. For example, the data parameters corresponding to bit sequences 0b00111 and 0b01000 indicate a selection of two or three data streams, respectfully, which are subsets of the four potential data streams transmittable by the base station 108.

It should also be noted that although the controller 206 has been described as being within each of the base stations 104, 108 and 110, the controller 206 can be implemented in a single base station such that the controller 206 manages the indexing operations of each other base station within the system 100. Alternatively or additionally, the controller 206 can be located at a control center (not shown) and can be configured to perform step 304 for each of the base stations within the system 100.

At step 306, under the direction of the controller 206, the transmitter 208 can transmit indications of the parameter information determined at step 304 to each of the receivers serviced by the corresponding base station 201. For example, the transmitter 208 can transmit the indices determined at step 304 to each corresponding receiver that the base station services. In addition, as indicated above, the transmitter 208 can explicitly signal the number of TX antenna employed at the corresponding base station.

At step 308, the transmitter 208, under the direction of the controller 206, can transmit data streams in accordance with the selected parameter information. For example, the transmitter 208 can transmit data streams to receivers serviced by the base station 201 in accordance with the total number of data streams, selected PSIs, RB assignments, modulation constellations, coding rates, PMI(s) used and/or the transmit power levels determined at step 304. Furthermore, as indicated above, the maximum number of data streams transmitted on a particular resource in a corresponding indexing scheme can be less than or equal to the number of transmit antennas to which the corresponding indexing scheme is customized. For example, in the lower portion of Table 2, the maximum number of data streams transmitted on a resource block is less than or equal to the four or less transmit antennas for which the lower portion is customized.

Figure 4:
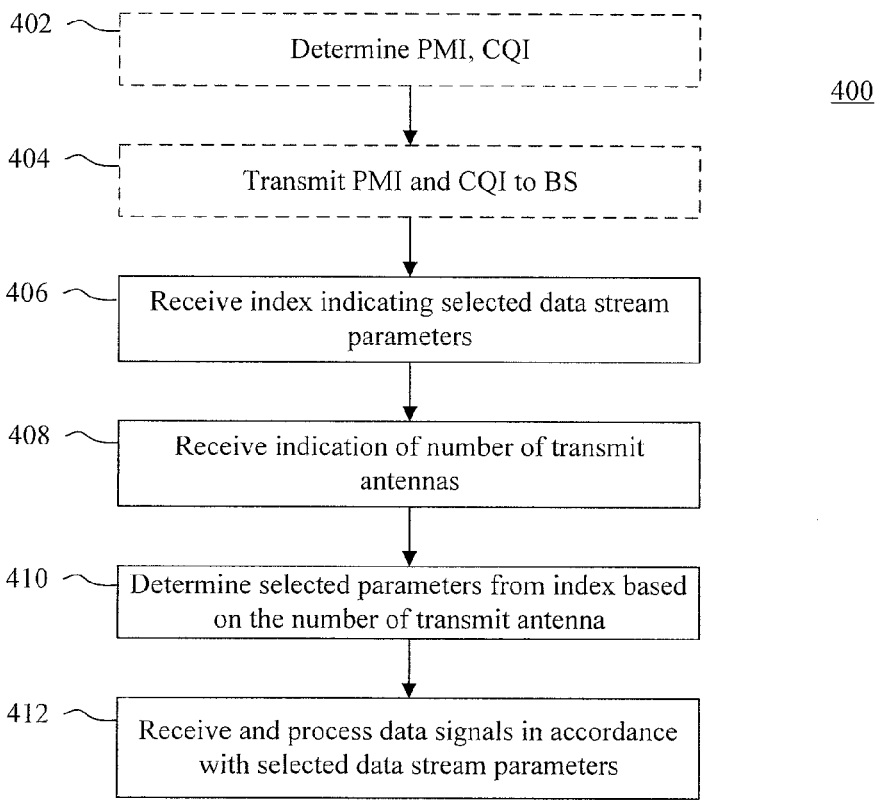
FIG. 4 is a high-level block/flow diagram of an exemplary method for decoding parameter allocation information.

Referring now to FIG. 4, with continuing reference to FIGS. 1-3, an exemplary method 400 for decoding parameter allocation information is illustrated. The method 400 can begin at optional step 402, in which the processor 210 of a receiver 102 may determine preferred precoder matrix index information and/or channel quality information. The determination of PMI and CQI information at a receiver 102 can be performed using methods known in the art. At optional step 404, the receiver 102 can employ the transmitter/receiver 212 to transmit the preferred precoder and/or channel quality information to the servicing base station 201.

At step 406, the transmitter/receiver 212 of the receiver 102 can receive an index indicating selected data stream parameters. For example, the receiver 212 can receive an index that is transmitted by the servicing base station in accordance with step 306 described above. In addition, at step 408, the receiver 212 can receive an indication of the number of transmit antennas at a servicing base station from which the data stream(s) will be received. Here, the receiver 212 can receive the indication of the number of transmit antennas directly from the servicing base station 201.

At step 410, the processor 210 of the receiver 102 can determine the selected data stream parameters from the index based on the number of transmit antennas at the servicing base station 201. In particular, the processor 210 can store and utilize a plurality of conversion schemes that are each customized to a different number of transmit antennas. The indexing schemes described above with regard to the method 300 are examples of such conversion schemes. Here, the processor 210 can be configured to convert the index by selecting one of the conversion schemes based on the number of transmit antenna at the servicing base station. For example, the processor 210 can be configured to apply the upper portion of Table 2 in response to determining that the number of antenna at the base station is eight and to apply the lower portion of Table 2 in response to determining that the number of antenna at the base station is four. As such, upon determination of the appropriate conversion scheme, the processor 210 can convert the index by cross-referencing the received index with the selected data stream parameters in accordance with the determined conversion scheme.

At step 412, the receiver 212 and the processor 210 can receive and process, respectively, data signals in accordance with the selected data stream parameters. For example, if the conversion schemes of Table 2 are employed, the processor 210 can utilize a PSI determined from the received index to select an appropriate pilot stream corresponding to the PSI. Further, the processor 210 can receive and process data signals in the pilot stream. Alternatively or additionally, the processor 210 can receive and process data signals in user-data streams on the data channel 103 in accordance with the selected data stream parameters by employing information in the pilot stream. As described above, the pilot streams can convey RB assignments for user-data streams, assigned modulation constellation per code word, coding rate per codeword, the PMI(s) used and/or the transmit power levels. As such, the processor 210 can receive data streams carrying user-data by selecting resource blocks on which the data streams are transmitted in accordance with the RB assignment and can process the data streams in accordance with the assigned modulation, coding rate and/or PMI. As stated above, any one or more of these parameters can be explicitly included in a conversion table and conveyed directly by the index in alternative embodiments.

It should also be noted that the processor 210 can process data signals in the pilot stream, or in data streams carrying user-data intended for the receiver, in accordance with information of co-scheduled users that can be determined from the received index, such as modulation information. For example, the processor can perform interference cancellation using the modulation information. Furthermore, other information about co-scheduled users can be conveyed in the index and utilized by the processor 210 to process data signals. For example, the index can inform the processor 210 of the precoders and power levels that are used to serve some or all of the other co-scheduled users to enable the processor 210 to estimate the corresponding effective channels and to design minimum mean-square error (MMSE) filters for each one of its assigned subcarriers. As a result, the processor 210 can suppress the interference it encounters due to the transmissions intended for the other co-scheduled receivers.

Further, for each RB where there is an overlap with another co-scheduled user, the index can inform the receiver of the precoders and power levels as well as the modulations that are used to serve some or all of the other co-scheduled users. With this information, the receiver can employ more sophisticated modulation-aware demodulators which generate more reliable log-likelihood ratios (LLRs) for its codewords and hence reduce its error probability. In addition, the index can inform the processor 210 of the precoders, power levels, modulations and the coding rates that are used to serve some or all of the other co-scheduled users that overlap completely with the receiver, i.e., they have the same RB assignment. Accordingly, based on this index, the user can perform interference cancellation by decoding the codewords of some or all of the other co-scheduled users and subtracting the re-constructed codewords.

It should be understood that a variety of other sets of data parameter information can be conveyed through the index to permit receivers to effectively reduce decoding errors. Moreover, because embodiments of the present invention described herein permit users to receive a wider scope of such information through the use of the number of transmit antennas, the embodiments can significantly enhance the quality of communications between base stations and receivers without increasing the amount of control information transmitted between them.

Having described preferred embodiments of a system and method for feed-forward control signaling and decoding (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method implemented in a base station used in a wireless communications system, the method comprising:

transmitting an index indicating data stream parameters in which a combination of a number of streams and an allocated pilot stream index is included; and transmitting an indication of a number of transmit antennas at the base station, wherein the data stream parameters for 8 transmit antennas are indicated by the index according to a first table in which the data stream parameters further include a modulation constellation of a paired user in a case of 2 stream transmission, wherein the data stream parameters for 4 transmit antennas are indicated by the index according to a second table in which the data stream parameters further include a modulation constellation of a paired user, and
wherein the first table comprises

| Syntax | Size (bit) | Description/Notes |
|---|---|---|
| Si | 5 | Index used to identify the combination of the number of streams and the allocated pilot stream index (PSI) in a transmission with MU-MIMO, and the modulation constellation of the paired user in the case of 2 stream transmission<br>0b00000: 2 streams with PSI = stream0 and other modulation = QPSK<br>0b00001: 2 streams with PSI = stream0 and other modulation = 16QAM<br>0b00010: 2 streams with PSI = stream0 and other modulation = 64QAM<br>0b00011: 2 streams with PSI = stream0 and other modulation information not available<br>0b00100: 2 streams with PSI = stream1 and other modulation = QPSK<br>0b00101: 2 streams with PSI = stream1 and other modulation = 16QAM<br>0b00110: 2 streams with PSI = stream1 and other modulation = 64QAM<br>0b00111: 2 streams with PSI = stream1 and other modulation information not available<br>0b01000: 3 streams with PSI = stream0<br>0b01001: 3 streams with PSI = stream1<br>0b01010: 3 streams with PSI = stream2<br>0b01011: 4 streams with PSI = stream0<br>0b01100: 4 streams with PSI = stream1<br>0b01101: 4 streams with PSI = stream2<br>0b01110: 4 streams with PSI = stream3<br>0b01111: 3 streams with PSI = stream0 and stream1<br>0b10000: 4 streams with PSI = stream0 and stream1<br>0b10001: 4 streams with PSI = stream2 and stream3<br>0b10010: 8 streams with PSI = stream0<br>0b10011: 8 streams with PSI = stream1<br>0b10100: 8 streams with PSI = stream2<br>0b10101: 8 streams with PSI = stream3<br>0b10110: 8 streams with PSI = stream4<br>0b10111: 8 streams with PSI = stream5<br>0b11000: 8 streams with PSI = stream6<br>0b11001: 8 streams with PSI = stream7<br>0b11010: 8 streams with PSI = stream0 and stream1<br>0b11011: 8 streams with PSI = stream2 and stream3<br>0b11100: 8 streams with PSI = stream4 and stream5<br>0b11101: 8 streams with PSI = stream6 and stream7<br>0b11110: reserved<br>0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user<br>0b00000: 2 streams with PSI = stream0 and other modulation = QPSK<br>0b00001: 2 streams with PSI = stream0 and other modulation = 16QAM<br>0b00010: 2 streams with PSI = stream0 and other modulation = 64QAM<br>0b00011: 2 streams with PSI = stream0 and other modulation information not available<br>0b00100: 2 streams with PSI = stream1 and other modulation = QPSK<br>0b00101: 2 streams with PSI = stream1 and other modulation = 16QAM<br>0b00110: 2 streams with PSI = stream1 and other modulation = 64QAM<br>0b00111: 2 streams with PSI = stream1 and other modulation information not available<br>0b01000: 3 streams with PSI = stream0<br>0b01001: 3 streams with PSI = stream1<br>0b01010: 3 streams with PSI = stream2<br>0b01011: 4 streams with PSI = stream0<br>0b01100: 4 streams with PSI = stream1<br>0b01101: 4 streams with PSI = stream2<br>0b01110: 4 streams with PSI = stream3<br>0b01111: 3 streams with PSI = stream0 and stream1<br>0b10000: 4 streams with PSI = stream0 and stream1<br>0b10001: 4 streams with PSI = stream2 and stream3<br>0b10010: 3 streams with PSI = stream2 and other modulation = QPSK<br>0b10011: 3 streams with PSI = stream2 and other modulation = 16QAM<br>0b10100: 3 streams with PSI = stream2 and other modulation = 64QAM<br>0b10101: 3 streams with PSI = stream0 and stream1 and other modulation = QPSK<br>0b10110: 3 streams with PSI = stream0 and stream1 and other modulation = 16QAM<br>0b10111: 3 streams with PSI = stream0 and stream1 and other modulation = 64QAM<br>0b11000: 4 streams with PSI = stream0 and stream1 and other modulation = QPSK<br>0b11001: 4 streams with PSI = stream0 and stream1 and other modulation = 16QAM<br>0b11010: 4 streams with PSI = stream0 and stream1 and other modulation = 64QAM<br>0b11011: 4 streams with PSI = stream2 and stream3 and other modulation = QPSK<br>0b11100: 4 streams with PSI = stream2 and stream3 and other modulation = 16QAM<br>0b11101: 4 streams with PSI = stream2 and stream3 and other modulation = 64QAM<br>0b11110: reserved<br>0b11111: reserved | where MU-MIMO stands for multi-user multiple input multiple output, QPSK stands for quadrature phase-shift keying, and QAM stands for quadrature amplitude modulation.

2. The method as in claim 1, further comprising:
transmitting a data signal in accordance with the data stream parameters.

3. A method implemented in a user equipment used in a wireless communications system, the method comprising:
receiving an index indicating data stream parameters in which a combination of a number of streams and an allocated pilot stream index is included; and
receiving an indication of a number of transmit antennas at a base station,
wherein the data stream parameters for 8 transmit antennas are indicated by the index according to a first table in which the data stream parameters further include a modulation constellation of a paired user in a case of 2 stream transmission,
wherein the data stream parameters for 4 transmit antennas are indicated by the index according to a second table in which the data stream parameters further include a modulation constellation of a paired user, and
wherein the first table comprises

| Syntax | Size (bit) | Description/Notes |
|---|---|---|
| Si | 5 | Index used to identify the combination of the number of streams and the allocated pilot stream index (PSI) |

-continued

| Syntax | Size (bit) | Description/Notes |
|---|---|---|
| | | in a transmission with MU-MIMO, and the modulation constellation of the paired user in the case of 2 stream transmission |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 8 streams with PSI = stream0 |
| | | 0b10011: 8 streams with PSI = stream1 |
| | | 0b10100: 8 streams with PSI = stream2 |
| | | 0b10101: 8 streams with PSI = stream3 |
| | | 0b10110: 8 streams with PSI = stream4 |
| | | 0b10111: 8 streams with PSI = stream5 |
| | | 0b11000: 8 streams with PSI = stream6 |
| | | 0b11001: 8 streams with PSI = stream7 |
| | | 0b11010: 8 streams with PSI = stream0 and stream1 |
| | | 0b11011: 8 streams with PSI = stream2 and stream3 |
| | | 0b11100: 8 streams with PSI = stream4 and stream5 |
| | | 0b11101: 8 streams with PSI = stream6 and stream7 |
| | | 0b11110: reserved |
| | | 0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |

-continued

| Syntax | Size (bit) | Description/Notes |
|---|---|---|
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 3 streams with PSI = stream2 and other modulation = QPSK |
| | | 0b10011: 3 streams with PSI = stream2 and other modulation = 16QAM |
| | | 0b10100: 3 streams with PSI = stream2 and other modulation = 64QAM |
| | | 0b10101: 3 streams with PSI = stream0 and stream1 and other modulation = QPSK |
| | | 0b10110: 3 streams with PSI = stream0 and stream1 and other modulation = 16QAM |
| | | 0b10111: 3 streams with PSI = stream0 and stream1 and other modulation = 64QAM |
| | | 0b11000: 4 streams with PSI = stream0 and stream1 and other modulation = QPSK |
| | | 0b11001: 4 streams with PSI = stream0 and stream1 and other modulation = 16QAM |
| | | 0b11010: 4 streams with PSI = stream0 and stream1 and other modulation = 64QAM |
| | | 0b11011: 4 streams with PSI = stream2 and stream3 and other modulation = QPSK |
| | | 0b11100: 4 streams with PSI = stream2 and stream3 and other modulation = 16QAM |
| | | 0b11101: 4 streams with PSI = stream2 and stream3 and other modulation = 64QAM |
| | | 0b11110: reserved |
| | | 0b11111: reserved | where MU-MIMO stands for multi-user multiple input multiple output, QPSK stands for quadrature phase-shift keying, and QAM stands for quadrature amplitude modulation.

4. The method as in claim 3, further comprising:
receiving a data signal in accordance with the data stream parameters.

5. A base station used in a wireless communications system, the base station comprising:
a transmitter to transmit an index indicating data stream parameters in which a combination of a number of streams and an allocated pilot stream index is included, and an indication of a number of transmit antennas at the base station,
wherein the data stream parameters for 8 transmit antennas are indicated by the index according to a first table in which the data stream parameters further include a modulation constellation of a paired user in a case of 2 stream transmission,
wherein the data stream parameters for 4 transmit antennas are indicated by the index according to a second table in which the data stream parameters further include a modulation constellation of a paired user, and
wherein the first table comprises

| Syntax | Size (bit) | Description/Notes |
|---|---|---|
| Si | 5 | Index used to identify the combination of the number of streams and the allocated pilot stream index (PSI) in a transmission with MU-MIMO, and the modulation constellation of the paired user in the case of 2 stream transmission |
| | | 0b00000: 2 streams with PSI = stream0 and other modulation = QPSK |
| | | 0b00001: 2 streams with PSI = stream0 and other |

-continued

| Syntax | Size (bit) | Description/Notes |
|---|---|---|
| | | modulation = 16QAM<br>0b00010: 2 streams with PSI = stream0 and other modulation = 64QAM<br>0b00011: 2 streams with PSI = stream0 and other modulation information not available<br>0b00100: 2 streams with PSI = stream1 and other modulation = QPSK<br>0b00101: 2 streams with PSI = stream1 and other modulation = 16QAM<br>0b00110: 2 streams with PSI = stream1 and other modulation = 64QAM<br>0b00111: 2 streams with PSI = stream1 and other modulation information not available<br>0b01000: 3 streams with PSI = stream0<br>0b01001: 3 streams with PSI = stream1<br>0b01010: 3 streams with PSI = stream2<br>0b01011: 4 streams with PSI = stream0<br>0b01100: 4 streams with PSI = stream1<br>0b01101: 4 streams with PSI = stream2<br>0b01110: 4 streams with PSI = stream3<br>0b01111: 3 streams with PSI = stream0 and stream1<br>0b10000: 4 streams with PSI = stream0 and stream1<br>0b10001: 4 streams with PSI = stream2 and stream3<br>0b10010: 8 streams with PSI = stream0<br>0b10011: 8 streams with PSI = stream1<br>0b10100: 8 streams with PSI = stream2<br>0b10101: 8 streams with PSI = stream3<br>0b10110: 8 streams with PSI = stream4<br>0b10111: 8 streams with PSI = stream5<br>0b11000: 8 streams with PSI = stream6<br>0b11001: 8 streams with PSI = stream7<br>0b11010: 8 streams with PSI = stream0 and stream1<br>0b11011: 8 streams with PSI = stream2 and stream3<br>0b11100: 8 streams with PSI = stream4 and stream5<br>0b11101: 8 streams with PSI = stream6 and stream7<br>0b11110: reserved<br>0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user<br>0b00000: 2 streams with PSI = stream0 and other modulation = QPSK<br>0b00001: 2 streams with PSI = stream0 and other modulation = 16QAM<br>0b00010: 2 streams with PSI = stream0 and other modulation = 64QAM<br>0b00011: 2 streams with PSI = stream0 and other modulation information not available<br>0b00100: 2 streams with PSI = stream1 and other modulation = QPSK<br>0b00101: 2 streams with PSI = stream1 and other modulation = 16QAM<br>0b00110: 2 streams with PSI = stream1 and other modulation = 64QAM<br>0b00111: 2 streams with PSI = stream1 and other modulation information not available<br>0b01000: 3 streams with PSI = stream0<br>0b01001: 3 streams with PSI = stream1<br>0b01010: 3 streams with PSI = stream2<br>0b01011: 4 streams with PSI = stream0<br>0b01100: 4 streams with PSI = stream1<br>0b01101: 4 streams with PSI = stream2<br>0b01110: 4 streams with PSI = stream3<br>0b01111: 3 streams with PSI = stream0 and stream1<br>0b10000: 4 streams with PSI = stream0 and stream1<br>0b10001: 4 streams with PSI = stream2 and stream3<br>0b10010: 3 streams with PSI = stream2 and other |

-continued

| Syntax | Size (bit) | Description/Notes |
|---|---|---|
| | | modulation = QPSK<br>0b10011: 3 streams with PSI = stream2 and other modulation = 16QAM<br>0b10100: 3 streams with PSI = stream2 and other modulation = 64QAM<br>0b10101: 3 streams with PSI = stream0 and stream1 and other modulation = QPSK<br>0b10110: 3 streams with PSI = stream0 and stream1 and other modulation = 16QAM<br>0b10111: 3 streams with PSI = stream0 and stream1 and other modulation = 64QAM<br>0b11000: 4 streams with PSI = stream0 and stream1 and other modulation = QPSK<br>0b11001: 4 streams with PSI = stream0 and stream1 and other modulation = 16QAM<br>0b11010: 4 streams with PSI = stream0 and stream1 and other modulation = 64QAM<br>0b11011: 4 streams with PSI = stream2 and stream3 and other modulation = QPSK<br>0b11100: 4 streams with PSI = stream2 and stream3 and other modulation = 16QAM<br>0b11101: 4 streams with PSI = stream2 and stream3 and other modulation = 64QAM<br>0b11110: reserved<br>0b11111: reserved | where MU-MIMO stands for multi-user multiple input multiple output, QPSK stands for quadrature phase-shift keying, and QAM stands for quadrature amplitude modulation.

6. The base station as in claim 5, wherein the transmitter further transmits a data signal in accordance with the data stream parameters.

7. A user equipment used in a wireless communications system, the user equipment comprising:
 a receiver to receive an index indicating data stream parameters in which a combination of a number of streams and an allocated pilot stream index is included, and an indication of a number of transmit antennas at a base station,
 wherein the data stream parameters for 8 transmit antennas are indicated by the index according to a first table in which the data stream parameters further include a modulation constellation of a paired user in a case of 2 stream transmission,
 wherein the data stream parameters for 4 transmit antennas are indicated by the index according to a second table in which the data stream parameters further include a modulation constellation of a paired user, and
 wherein the first table comprises

| Syntax | Size (bit) | Description/Notes |
|---|---|---|
| Si | 5 | Index used to identify the combination of the number of streams and the allocated pilot stream index (PSI) in a transmission with MU-MIMO, and the modulation constellation of the paired user in the case of 2 stream transmission<br>0b00000: 2 streams with PSI = stream0 and other modulation = QPSK<br>0b00001: 2 streams with PSI = stream0 and other modulation = 16QAM<br>0b00010: 2 streams with PSI = stream0 and other modulation = 64QAM<br>0b00011: 2 streams with PSI = stream0 and other modulation information not available<br>0b00100: 2 streams with PSI = stream1 and other modulation = QPSK |

| Syntax | Size (bit) | Description/Notes |
|---|---|---|
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 8 streams with PSI = stream0 |
| | | 0b10011: 8 streams with PSI = stream1 |
| | | 0b10100: 8 streams with PSI = stream2 |
| | | 0b10101: 8 streams with PSI = stream3 |
| | | 0b10110: 8 streams with PSI = stream4 |
| | | 0b10111: 8 streams with PSI = stream5 |
| | | 0b11000: 8 streams with PSI = stream6 |
| | | 0b11001: 8 streams with PSI = stream7 |
| | | 0b11010: 8 streams with PSI = stream0 and stream1 |
| | | 0b11011: 8 streams with PSI = stream2 and stream3 |
| | | 0b11100: 8 streams with PSI = stream4 and stream5 |
| | | 0b11101: 8 streams with PSI = stream6 and stream7 |
| | | 0b11110: reserved |
| | | 0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 3 streams with PSI = stream2 and other modulation = QPSK |
| | | 0b10011: 3 streams with PSI = stream2 and other modulation = 16QAM |
| | | 0b10100: 3 streams with PSI = stream2 and other modulation = 64QAM |
| | | 0b10101: 3 streams with PSI = stream0 and stream1 and other modulation = QPSK |
| | | 0b10110: 3 streams with PSI = stream0 and stream1 and other modulation = 16QAM |
| | | 0b10111: 3 streams with PSI = stream0 and stream1 and other modulation = 64QAM |
| | | 0b11000: 4 streams with PSI = stream0 and stream1 and other modulation = QPSK |
| | | 0b11001: 4 streams with PSI = stream0 and stream1 and other modulation = 16QAM |
| | | 0b11010: 4 streams with PSI = stream0 and stream1 and other modulation = 64QAM |
| | | 0b11011: 4 streams with PSI = stream2 and stream3 and other modulation = QPSK |
| | | 0b11100: 4 streams with PSI = stream2 and stream3 and other modulation = 16QAM |
| | | 0b11101: 4 streams with PSI = stream2 and stream3 and other modulation = 64QAM |
| | | 0b11110: reserved |
| | | 0b11111: reserved | where MU-MIMO stands for multi-user multiple input multiple output, QPSK stands for quadrature phase-shift keying, and QAM stands for quadrature amplitude modulation.

8. The user equipment as in claim 7,
wherein the receiver further receives a data signal in accordance with the data stream parameters.

9. A method implemented in a wireless communications system, the method comprising:
transmitting, from a base station to a user equipment, an index indicating data stream parameters in which a combination of a number of streams and an allocated pilot stream index is included; and
transmitting, from the base station to the user equipment, an indication of a number of transmit antennas at the base station,
wherein the data stream parameters for 8 transmit antennas are indicated by the index according to a first table in which the data stream parameters further include a modulation constellation of a paired user in a case of 2 stream transmission,
wherein the data stream parameters for 4 transmit antennas are indicated by the index according to a second table in which the data stream parameters further include a modulation constellation of a paired user, and
wherein the first table comprises

| Syntax | Size (bit) | Description/Notes |
|---|---|---|
| Si | 5 | Index used to identify the combination of the number of streams and the allocated pilot stream index (PSI) in a transmission with MU-MIMO, and the modulation constellation of the paired user in the case of 2 stream transmission |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |

| Syntax | Size (bit) | Description/Notes |
|---|---|---|
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 8 streams with PSI = stream0 |
| | | 0b10011: 8 streams with PSI = stream1 |
| | | 0b10100: 8 streams with PSI = stream2 |
| | | 0b10101: 8 streams with PSI = stream3 |
| | | 0b10110: 8 streams with PSI = stream4 |
| | | 0b10111: 8 streams with PSI = stream5 |
| | | 0b11000: 8 streams with PSI = stream6 |
| | | 0b11001: 8 streams with PSI = stream7 |
| | | 0b11010: 8 streams with PSI = stream0 and stream1 |
| | | 0b11011: 8 streams with PSI = stream2 and stream3 |
| | | 0b11100: 8 streams with PSI = stream4 and stream5 |
| | | 0b11101: 8 streams with PSI = stream6 and stream7 |
| | | 0b11110: reserved |
| | | 0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 3 streams with PSI = stream2 and other modulation = QPSK |
| | | 0b10011: 3 streams with PSI = stream2 and other modulation = 16QAM |
| | | 0b10100: 3 streams with PSI = stream2 and other modulation = 64QAM |
| | | 0b10101: 3 streams with PSI = stream0 and stream1 and other modulation = QPSK |
| | | 0b10110: 3 streams with PSI = stream0 and stream1 and other modulation = 16QAM |
| | | 0b10111: 3 streams with PSI = stream0 and stream1 and other modulation = 64QAM |
| | | 0b11000: 4 streams with PSI = stream0 and stream1 and other modulation = QPSK |
| | | 0b11001: 4 streams with PSI = stream0 and stream1 and other modulation = 16QAM |
| | | 0b11010: 4 streams with PSI = stream0 and stream1 and other modulation = 64QAM |
| | | 0b11011: 4 streams with PSI = stream2 and stream3 and other modulation = QPSK |
| | | 0b11100: 4 streams with PSI = stream2 and stream3 and other modulation = 16QAM |
| | | 0b11101: 4 streams with PSI = stream2 and stream3 and other modulation = 64QAM |
| | | 0b11110: reserved |
| | | 0b11111: reserved | where MU-MIMO stands for multi-user multiple input multiple output, QPSK stands for quadrature phase-shift keying, and QAM stands for quadrature amplitude modulation.

10. The method as in claim 9, further comprising:
transmitting, from the base station to the user equipment, a data signal in accordance with the data stream parameters.

11. A wireless communications system comprising:
a user equipment; and
a base station to transmit, to the user equipment, an index indicating data stream parameters in which a combination of a number of streams and an allocated pilot stream index is included, and an indication of a number of transmit antennas at the base station,
wherein the data stream parameters for 8 transmit antennas are indicated by the index according to a first table in which the data stream parameters further include a modulation constellation of a paired user in a case of 2 stream transmission,
wherein the data stream parameters for 4 transmit antennas are indicated by the index according to a second table in which the data stream parameters further include a modulation constellation of a paired user, and
wherein the first table comprises

| Syntax | Size (bit) | Description/Notes |
|---|---|---|
| Si | 5 | Index used to identify the combination of the number of streams and the allocated pilot stream index (PSI) in a transmission with MU-MIMO, and the modulation constellation of the paired user in the case of 2 stream transmission |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |

| Syntax | Size (bit) | Description/Notes |
|---|---|---|
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 8 streams with PSI = stream0 |
| | | 0b10011: 8 streams with PSI = stream1 |
| | | 0b10100: 8 streams with PSI = stream2 |
| | | 0b10101: 8 streams with PSI = stream3 |
| | | 0b10110: 8 streams with PSI = stream4 |
| | | 0b10111: 8 streams with PSI = stream5 |
| | | 0b11000: 8 streams with PSI = stream6 |
| | | 0b11001: 8 streams with PSI = stream7 |
| | | 0b11010: 8 streams with PSI = stream0 and stream1 |
| | | 0b11011: 8 streams with PSI = stream2 and stream3 |
| | | 0b11100: 8 streams with PSI = stream4 and stream5 |
| | | 0b11101: 8 streams with PSI = stream6 and stream7 |
| | | 0b11110: reserved |
| | | 0b11111: reserved | and the second table comprises

| Syntax | Size (bit) | Description/Notes |
|---|---|---|
| Si | 5 | Index used to identify the combination of the number of streams and the allocated pilot stream index in a transmission with MU-MIMO, and the modulation constellation of the paired user |
| | | 0b00000: 2 streams with PSI = stream0 and other modulation = QPSK |
| | | 0b00001: 2 streams with PSI = stream0 and other modulation = 16QAM |
| | | 0b00010: 2 streams with PSI = stream0 and other modulation = 64QAM |
| | | 0b00011: 2 streams with PSI = stream0 and other modulation information not available |
| | | 0b00100: 2 streams with PSI = stream1 and other modulation = QPSK |
| | | 0b00101: 2 streams with PSI = stream1 and other modulation = 16QAM |
| | | 0b00110: 2 streams with PSI = stream1 and other modulation = 64QAM |
| | | 0b00111: 2 streams with PSI = stream1 and other modulation information not available |
| | | 0b01000: 3 streams with PSI = stream0 |
| | | 0b01001: 3 streams with PSI = stream1 |
| | | 0b01010: 3 streams with PSI = stream2 |
| | | 0b01011: 4 streams with PSI = stream0 |
| | | 0b01100: 4 streams with PSI = stream1 |
| | | 0b01101: 4 streams with PSI = stream2 |
| | | 0b01110: 4 streams with PSI = stream3 |
| | | 0b01111: 3 streams with PSI = stream0 and stream1 |
| | | 0b10000: 4 streams with PSI = stream0 and stream1 |
| | | 0b10001: 4 streams with PSI = stream2 and stream3 |
| | | 0b10010: 3 streams with PSI = stream2 and other modulation = QPSK |
| | | 0b10011: 3 streams with PSI = stream2 and other modulation = 16QAM |
| | | 0b10100: 3 streams with PSI = stream2 and other modulation = 64QAM |
| | | 0b10101: 3 streams with PSI = stream0 and stream1 and other modulation = QPSK |
| | | 0b10110: 3 streams with PSI = stream0 and stream1 and other modulation = 16QAM |
| | | 0b10111: 3 streams with PSI = stream0 and stream1 and other modulation = 64QAM |
| | | 0b11000: 4 streams with PSI = stream0 and stream1 and other modulation = QPSK |
| | | 0b11001: 4 streams with PSI = stream0 and stream1 and other modulation = 16QAM |
| | | 0b11010: 4 streams with PSI = stream0 and stream1 and other modulation = 64QAM |
| | | 0b11011: 4 streams with PSI = stream2 and stream3 and other modulation = QPSK |
| | | 0b11100: 4 streams with PSI = stream2 and stream3 and other modulation = 16QAM |
| | | 0b11101: 4 streams with PSI = stream2 and stream3 and other modulation = 64QAM |
| | | 0b11110: reserved |
| | | 0b11111: reserved | where MU-MIMO stands for multi-user multiple input multiple output, QPSK stands for quadrature phase-shift keying, and QAM stands for quadrature amplitude modulation.

12. The wireless communications system as in claim 11, wherein the base station further transmits, to the user equipment, a data signal in accordance with the data stream parameters.

* * * * *